（12）United States Patent
Rimsky et al.

(10) Patent No.: US 11,383,985 B2
(45) Date of Patent: Jul. 12, 2022

(54) HYBRID SILICA GEL MADE OF POROUS SILICA PARTICLES

(71) Applicants: VKR HOLDING A/S, Hørsholm (DK); UT-BATTELLE, LLC, Oak Ridge, TN (US)

(72) Inventors: Charles Joseph Rimsky, Greenwood, SC (US); Jaswinder Kumar Sharma, Oak Ridge, TN (US); Mahabir Singh Bhandari, Oak Ridge, TN (US); Panagiotis George Datskos, Knoxville, TN (US); Georgios Polyzos, Oak Ridge, TN (US)

(73) Assignee: VKR HOLDING A/S, Horsholm (DK)

( * ) Notice: Subject to any disclaimer, the term of this patent is extended or adjusted under 35 U.S.C. 154(b) by 546 days.

(21) Appl. No.: 16/099,797

(22) PCT Filed: May 24, 2017

(86) PCT No.: PCT/US2017/034221
§ 371 (c)(1),
(2) Date: Nov. 8, 2018

(87) PCT Pub. No.: WO2017/222733
PCT Pub. Date: Dec. 28, 2017

(65) Prior Publication Data
US 2019/0152789 A1    May 23, 2019

Related U.S. Application Data

(60) Provisional application No. 62/340,630, filed on May 24, 2016.

(51) Int. Cl.
*C01B 33/155*   (2006.01)
*C04B 26/32*   (2006.01)
(Continued)

(52) U.S. Cl.
CPC .............. *C01B 33/155* (2013.01); *B32B 5/16* (2013.01); *B32B 17/068* (2013.01);
(Continued)

(58) Field of Classification Search
CPC ....... C01B 33/155; C01B 33/14; C04B 26/32; C04B 28/003; C04B 2111/28;
(Continued)

(56) References Cited

U.S. PATENT DOCUMENTS

| 2004/0132846 A1 | 7/2004 | Leventis et al. |
| 2006/0291200 A1 | 12/2006 | Milburn et al. |
| 2017/0015561 A1* | 1/2017 | Masuyama ........ B01D 67/0048 |

FOREIGN PATENT DOCUMENTS

| CN | 103949228 B | * 12/2015 | |
| JP | 2015187060 A | * 10/2015 | ........... C01B 33/126 |
| WO | 2016019308 A1 | 2/2016 | |

OTHER PUBLICATIONS

Adachi, Motonari, Toshio Harada, and Makoto Harada. "Formation processes of silica nanotubes through a surfactant-assisted templating mechanism in laurylamine hydrochloride/tetraethoxysilane system." Langmuir 16.5 (2000): 2376-2384.*

(Continued)

Primary Examiner — Richard M Rump
(74) Attorney, Agent, or Firm — Parker Poe Adams and Bernstein, LLP

(57) ABSTRACT

Compositions, methods, and articles of manufacture relating to a transparent/translucent insulating material formed by a hybrid silica gel composition made of porous silica particles joined with each other by silane crosslinking through a three dimensional silica network. In one embodiment, the hybrid silica gel includes small porous silica particles, and is made by a process that avoids energy intensive techniques.

15 Claims, 6 Drawing Sheets

(51) Int. Cl.
*B32B 17/06* (2006.01)
*C04B 28/00* (2006.01)
*C01B 33/14* (2006.01)
*B32B 5/16* (2006.01)
*C04B 111/28* (2006.01)

(52) U.S. Cl.
CPC ............ *B32B 17/069* (2013.01); *C01B 33/14* (2013.01); *C04B 26/32* (2013.01); *C04B 28/003* (2013.01); *B32B 2307/304* (2013.01); *B32B 2307/412* (2013.01); *C01P 2004/64* (2013.01); *C01P 2006/17* (2013.01); *C01P 2006/37* (2013.01); *C04B 2111/28* (2013.01)

(58) Field of Classification Search
CPC ....... B32B 17/069; B32B 5/16; B32B 17/068; B32B 2307/304; B32B 2307/412; C01P 2004/64; C01P 2006/17; C01P 2006/37
See application file for complete search history.

(56) References Cited

OTHER PUBLICATIONS

English machine translation of CN103949228B (2015).*
Reinheimer, Preston Glenn. Construction of a multi-functional cryogenic propellant tank with cross-linked silica aerogel. The University of Alabama, 2010.*
Aerogel.org "How is Aerogel Made?" Mar. 5, 2016; https://web.archive.org/web/20160305003906/http://www.aerogel.org.
Down, "HPLC Going Green: Generic Replacement of Acetonitrille," Jul. 18, 2015; http://www.separationsnow.com/details/ezine/14e071a8ac5/hplc-going-green-genereicreplacement-of-acetonitrile-with-acetone.html.

* cited by examiner

HYBRID SILICA GEL MADE OF POROUS SILICA PARTICLES

CROSS REFERENCE TO RELATED APPLICATIONS

The present invention claims the benefit of priority of U.S. Application No. 62,340,630 filed on May 24, 2016, which is incorporated herein as if set forth in its entirety.

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

THE NAMES OF PARTIES TO A JOINT RESEARCH AGREEMENT

The invention was made under CRADA Agreement number NFE-14-05402 between UT-Battelle, LLC and Velux Design and Development Company USA, Inc.

BACKGROUND OF THE INVENTION

The present invention relates generally to methods, compositions of matter, and articles of manufacture relating to silica gel. More particularly, the invention relates to a hybrid silica gel composition made with porous silica particles.

Fenestration systems play important roles in the energy utilization in buildings in that they allow sunlight to enter, retain thermal heat energy, and provide a barrier to wind and rain. They also serve to aesthetically enhance the appearance of both the interior and exterior of buildings. However, most existing fenestration systems are normally the least thermally insulating component, and thus the main source of heat loss/gain from the building envelope. Ideally, a window or skylight allows clear viewing, is capable of transmitting sunlight, and poses a thermal resistance per area that is comparable to surrounding building walls.

Various technologies have been used to increase the insulation performance of these systems. For example, utilizing double pane or double fenestration glazing, including having a vacuum or filling with inert gas between the glass panes or use of triple or quadruple panes has been tried. However, each of these solutions has its own disadvantages—for example, leakage, thermal stress, and high cost for vacuum between panes, and leakage and higher convection for gas between panes.

Plastic or glass capillaries or honeycomb structures have also been employed for enhanced transparency and thermal insulation. These alternatives also have disadvantages. Plastic becomes unstable at higher temperatures, and glass increases the glazing unit weight. Moreover, these structures need wide (≥5 cm) interspace, which requires special sealing and spacers.

Another technology is the use of aerogel as a transparent insulating material. Aerogels are a class of solid materials that certain physical properties, such as high porosity, large surface area, low density, and low heat conductivity. Despite certain advantages, when aerogel is used in fenestration systems, such as aerogel filled window panes, the system tends to be hazy or less than completely transparent due to the light scattering that occurs with this material. Furthermore, an aerogel must be fabricated in such a way to improve strength. Aerogels are prepared using sol-gel processing techniques followed by a supercritical drying step in which the solvent used in the process is extracted to leave an open pore structure. However, supercritical aerogel processing is energy intensive and conventional aerogels still lack durability.

Accordingly, there is a need for a more transparent, durable material that provides effective insulation, and that can be processed effectively at competitive costs.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented.

The present invention includes a transparent/translucent insulation material. In one embodiment, the insulation material includes a hybrid silica gel composition made of porous silica particles joined by silane crosslinking with each other through a three dimensional silica network. As used herein, "transparent/translucent" will refer to a material that is either transparent or translucent.

The present invention further includes a method for making a transparent/translucent insulating material. In one embodiment, the method may include the steps of: providing porous silica particles; preparing a solvent solution containing porous silica particles; providing a hydrolyzed solution containing an alkoxide of silicon; introducing the solvent solution to the hydrolyzed solution to form a hybrid silica gel; and drying the hybrid silica gel to form a transparent/translucent insulation gel. In another embodiment, the hydrolyzed solution may be prepared by hydrolyzing a silicon alkoxide with an acid or base.

In another embodiment, the method for making a transparent/translucent insulating material may include the steps of: providing porous silica particles; providing an alkoxide of silicon; hydrolyzing the alkoxide with an acid or base; adding the porous silica particles in a solvent to the hydrolyzing solution to form a hybrid gel; and drying the hybrid gel to form the transparent/translucent insulating material.

In another embodiment, the method for making a transparent/translucent insulating material may include the steps of: providing porous silica particles made by one of three methods described above; preparing a solvent solution containing the porous silica particles; sonicating the solvent solution; centrifuging the sonicated solution to remove any aggregated particles from the solvent solution; providing an alkoxide of silicon; hydrolyzing the alkoxide with an acid or base; adding the porous silica particles in a solvent solution to the hydrolyzing solution to form a hybrid gel; and drying the hybrid gel to form the transparent/translucent insulating material.

The present invention further includes articles of manufacture incorporating the transparent/translucent insulating material. In one embodiment, the article of manufacture of the present invention includes a fenestration system incorporating a hybrid silica gel composition. In one embodiment, the fenestration system includes a first planar pane of glass and a second planar plate of glass that defines an enclosed chamber. Within the chamber, a volume of a composition of the hybrid silica gel is provided. Preferably, the chamber is sealed with a suitable gasket.

Further features of the present invention will be apparent from the description that follows and the appended drawings, and in part will be obvious from the description, or may be learned by practice of the invention. It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF REPRESENTATIVE EMBODIMENTS

The present invention relates to a transparent/translucent insulation material, a method for making the same, and an article of manufacture that incorporates the same. The transparent/translucent insulation material of the present invention may be made with better energy saving techniques. Additionally, the present invention preferably provides a material with reduced thermal conductivity and visibility properties to achieve a transparent/translucent insulation material for effective use in fenestration systems.

Reference now will be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

Figure 1:
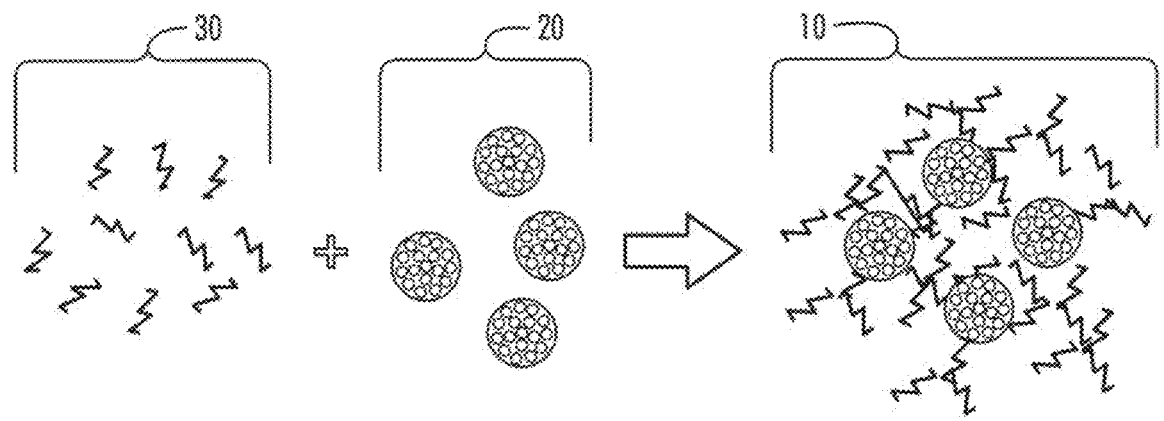
FIG. 1 schematically illustrates a hybrid silica gel formed by porous silica particles and silica precursors according to an embodiment of the present invention.

In accordance with the various embodiments of the present invention, FIG. 1 schematically shows an exemplary transparent insulation material and its components. In this embodiment, the transparent/translucent insulation material may include a hybrid silica gel 10 of porous silica particles 20 dispersed within a three dimensional silica network formed using with silica crosslinking agents 30.

A feature of the present invention includes a composition that is lightweight, mechanically durable, and highly thermally insulating. Preferably, the thermal insulating material of the present invention provides sufficient thermal insulation for effective use in fenestration systems. In one embodiment, the transparent/translucent material may include a hybrid silica gel that may have a thermal resistance, as measured by R-value, of about ≥5 hr·ft$^{2 \cdot \circ}$ F./Btu. In another embodiment, the transparent/translucent material may include a hybrid silica gel that may have a thermal resistance of about ≥6 hr·ft$^{2 \cdot \circ}$ F./Btu. In still another embodiment, the transparent/translucent material may include a hybrid silica gel that may have a thermal conductivity, as measured by k-value, between about 0.03293 W/m.K or less. In still another embodiment, the transparent/translucent material may include a hybrid silica gel that may have a thermal conductivity of about 0.032 W/m.K or less. In yet another embodiment, the transparent/translucent material may include a hybrid silica gel having a thermal conductivity that is about 0.15 W/m.K to about 0.032 W/m.K. In yet another embodiment, the transparent/translucent material may include a hybrid silica gel that may have a thermal conductivity of about 0.15 W/m.K to about 0.022 W/m.K.

Figure 2:
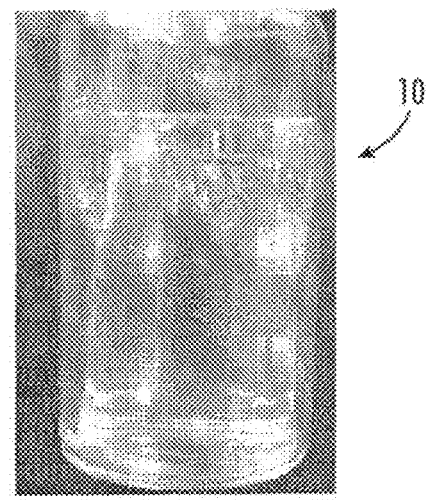
FIG. 2 is a photograph illustrating a hybrid silica gel formed by porous silica particles and silica precursors according to an embodiment of the present invention.

Another feature of the present invention includes a composition that is sufficiently transparent/translucent, as well as highly thermally insulating. A photograph taken from an example of an embodiment of a thermal insulating material including a hybrid silica gel 10 is shown in FIG. 2. As illustrated, the material is preferably transparent/translucent and substantially devoid of haziness. In one embodiment, the transparent/translucent material may include a hybrid silica gel that may have a visible transmittance of about ≥50%. In another embodiment, the transparent/translucent material may include a hybrid silica gel that may have a visible transmittance of approximately 70%. In yet another embodiment, the transparent/translucent material may include a hybrid silica gel that may have a visible transmittance that is approximately 80% or more. In yet another embodiment, the transparent/translucent material may include a hybrid silica gel that may have visible transmittance that is about 100% and light scattering that is about <0.5%.

The thermal conductivity and light transmittance features of the present invention may be impacted by certain properties of the porous silica particles. Accordingly, a feature of the present invention includes the use of porous silica particles 20 that may have a certain size, including a certain diameter and a certain pore size, that may be effective in minimizing heat transfer and visible light scattering so as to achieve an effective transparent/translucent insulating material.

In one exemplary embodiment, the diameter of the porous silica particles 20 may be less than 100 nm and the pore size may be ≤20 nm. In another embodiment, the diameter of the porous silica particles may be approximately 60 nm and the pore size may be ≤20 nm.

Figure 3A:
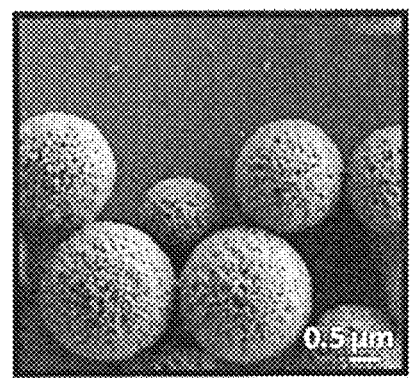
FIG. 3A is a photograph showing porous silica particles of a certain grain size according to an embodiment of the present invention.
Figure 3B:
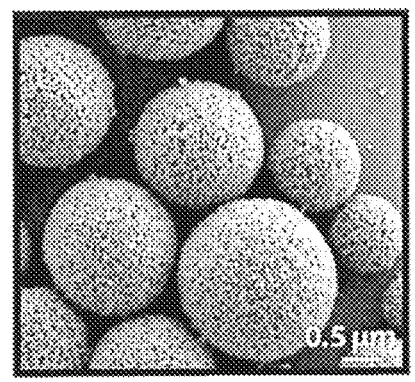
FIG. 3B is a photograph showing porous silica particles of a certain grain size according to an embodiment of the present invention.
Figure 3C:
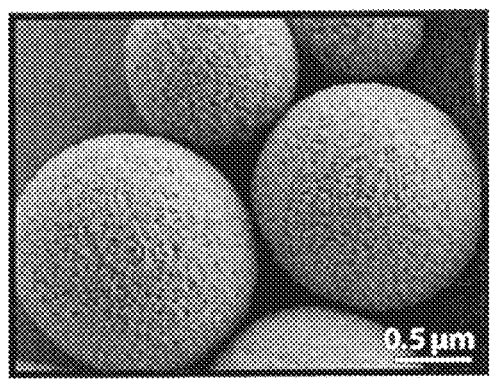
FIG. 3C is a photograph showing porous silica particles of a certain grain size according to an embodiment of the present invention.

In another exemplary embodiment, the porous silica particles 20 may have a certain grain size, as illustrated in the exemplary photographs shown in FIGS. 3a-c. These images, which were taken using a scanning electron microscope (SEM), show porous silica particles with different unit nanoparticle (grain) size. In one embodiment of the present invention, the porous silica particles may include a small grain of about 60 nm, as opposed to a large grain of about 80 nm, or a very small grain size of about 20 nm.

In still another exemplary embodiment, the porous silica particles may include micropores and macropores. In one embodiment, the micropores of the porous silica particles may be between about 1 nm to about 6 nm, and the macropores of the porous silica particles may be between about 50 nm to about 100 nm. In another embodiment, the micropores of the porous silica particles may be at least 3.5 nm. In still another embodiment the macropores of the porous silica particles may be no more than 100 nm.

In still another exemplary embodiment, the overall pore volume of the transparent/translucent insulation material may be about 80% or more. In yet another exemplary embodiment, the overall pore volume of the transparent/translucent insulation material may be about 95% to about 99%.

Figure 4:
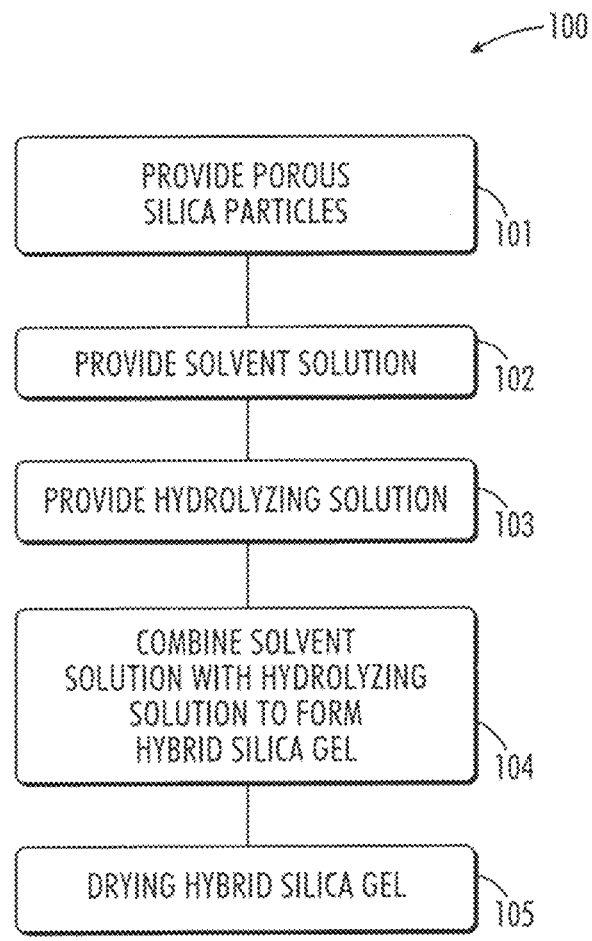
FIG. 4 shows a method for preparing a hybrid silica gel according to an embodiment of the present invention.

The present invention further includes a method for making a transparent/translucent insulating material. In one embodiment illustrated in FIG. 4, the method 100 of the present invention may include: the step 101 of providing porous silica particles; the step 102 of preparing a solvent solution containing porous silica particles; the step 103 of providing a hydrolyzed or partially hydrolyzed solution of a silica precursor; the step 104 of adding the solvent solution to the hydrolyzed solution to form a hybrid gel; and the step 105 of drying the hybrid gel to form the transparent/translucent insulating material.

In accordance with various embodiments of the method of the present invention, the step 101 of providing porous silica particles may include preparing porous silica particles that may have certain properties, such as those described herein. For example, the step of providing porous silica particles 101 may include preparing porous silica particles that may have a certain diameter, a certain grain size, and a certain pore size, including a certain micropore and a macropore size.

In one exemplary embodiment, the step 101 of providing porous silica particles may include a method of preparing porous silica particles having a certain pore size. In still another exemplary embodiment, the step 101 of providing porous silica particles may include a method of preparing porous silica particles having a certain micropore size and a certain macropore size.

Figure 5:
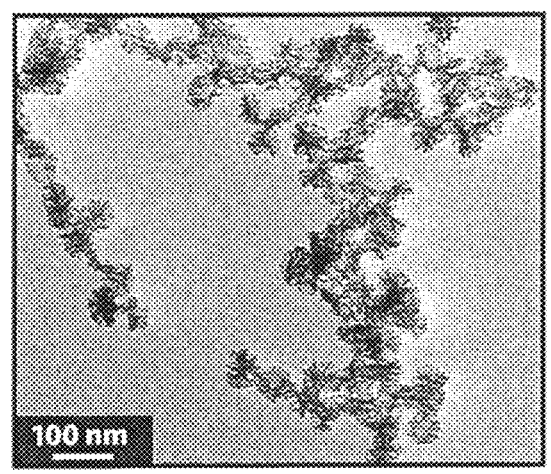
FIG. 5 is a photograph showing porous silica particles according to an embodiment of the present invention.

In another embodiment, the step 101 of providing porous silica particles of a certain pore size may include porous silica particles was about 60 nm, and the average micropore size was about 3.5 nm. As shown in FIG. 5, such porous silica particles are shown using a transmission electron microscope image.

In accordance with various embodiments of the method of the present invention, the step 102 of preparing a solvent solution containing porous silica particles may include the step of: providing ethyl alcohol as a solvent. In another exemplary embodiment, the step 102 of preparing a solvent containing porous silica particles may include the step of: providing acetonitrile as a solvent. In another exemplary embodiment, the step 102 of preparing a solvent containing porous silica particles may include the step of: providing a mixture of ethanol and acetonitrile as a solvent. In still another exemplary embodiment, the step 102 of preparing a solvent containing porous silica particles may be followed by the step of exchanging a first solvent for a second solvent. In one exemplary embodiment using a solvent exchanging step, the solvent exchanging step may include the exchange of ethanol as a first solvent with acetonitrile as a second solvent. In one exemplary embodiment using a solvent exchanging step, the solvent exchanging step may include the exchange of ethanol as a first solvent with hexane as a second solvent.

In accordance with various embodiments of the present invention, the step 103 of providing a hydrolyzed or partially hydrolyzed solution containing a silica precursor may include: providing a silica precursor; hydrolyzing the silica precursor in an acid or base solution. In one exemplary embodiment, the silica precursor may be Tetraethyl orthosilicate (TEOS).

In accordance with various embodiments of the present invention, one embodiment of step 104 of adding a solvent solution containing porous silica particles to a hydrolyzed solution may include: adding a solvent solution containing porous silica particles to a prehydrolyzed solution containing a silica precursor. In another embodiment, the step 104 may include: adding a solvent solution containing porous silica particles during the hydrolyzing of a silica precursor.

In accordance with various embodiments of the present invention, one embodiment of step 105 of drying the hybrid silica gel may include: drying the hybrid silica gel by controlled evaporation. In one exemplary embodiment, the step of drying the hybrid silica gel by controlled evaporation may include: containing the hybrid silica gel; providing a barrier between the contained hybrid silica gel and the atmosphere sufficient to reduce the rate of release of solvent vapors from the hybrid silica gel; and providing openings in the barrier sufficient to allow the release of solvent vapors from the hybrid silica gel over time. In another exemplary embodiment, the step of drying the hybrid silica get by controlled evaporation may include: providing a container; placing the hybrid silica gel in the container; and covering the container with a film containing openings. One container cover that may be used is paraffin film. In another exemplary embodiment, the step of drying the hybrid silica gel by controlled evaporation may include: providing a container; placing the hybrid silica gel in the container; and closing the container with a loose fitting lid. In still another exemplary embodiment, the step of drying the hybrid silica gel by controlled evaporation may take up to one week.

In accordance with various embodiments of the present invention, one embodiment of step 105 of drying the hybrid silica gel may include; drying the hybrid silica gel by freeze drying, by supercritical drying, or by atmospheric evaporation techniques.

Figure 6:
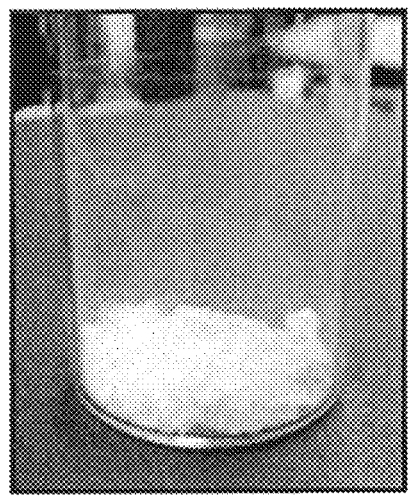
FIG. 6 is a photograph showing porous an open drying chamber containing a collapsed hybrid silica gel according to an embodiment of the present invention.
Figure 7:
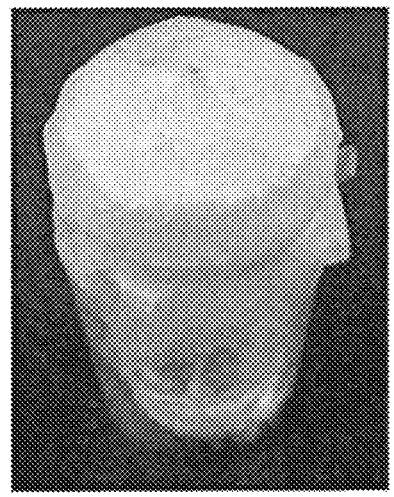
FIG. 7 is a photograph showing a closed drying chamber containing a hybrid silica gel according to an embodiment of the present invention.

Photographs illustrating the difference between direct evaporation and controlled evaporation according to the exemplary embodiment are shown in FIGS. 6 and 7. As illustrated, controlling the rate at which solvent vapors are released from the hybrid silica gel, such as with a film cover shown in FIG. 7, may help avoid crumbling of the gel and powder formation, shown in FIG. 6, as well as minimize pore collapsing and gel shrinkage.

Referring back to FIG. 4 and in view of the various embodiments of steps of the present method 100, one exemplary method may include the steps of: providing porous silica particles; providing a hydrolyzed or partially hydrolyzed silica precursor, such as TEOS; mixing the hydrolyzed silica precursor with an ethanol solution of the porous silica particles in the presence of water and $NH_4Oh$ at 50° C. to form a hybrid silica gel; adding water; annealing the hybrid silica gel at 50° C.; and drying the hybrid silica gel.

Another exemplary method 100 may include the steps of: providing porous silica particles; providing a hydrolyzed or partially hydrolyzed silica precursor, such as TEOS; mixing the hydrolyzed silica precursor with an ethanol solution of the porous silica particles and excess acetonitrile in the presence of water and $NH_4Oh$ at 50° C. to form a hybrid silica gel; and drying the hybrid silica gel. In another exemplary embodiment using acetonitrile as a solvent, the method may further include the steps of: adding water; and annealing the hybrid silica gel at a high temperature before the drying step.

Figure 8:
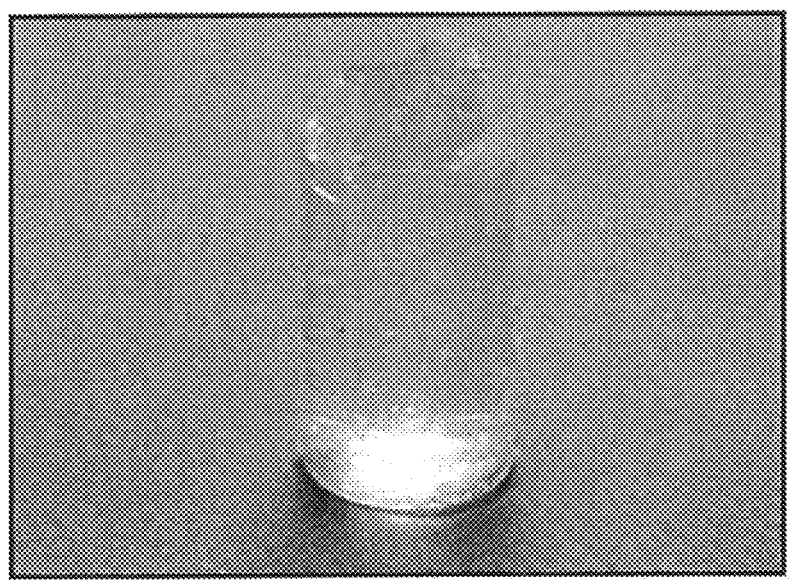
FIG. 8 is a photograph showing a dried hybrid silica gel according to an embodiment of the present invention.
Figure 9:
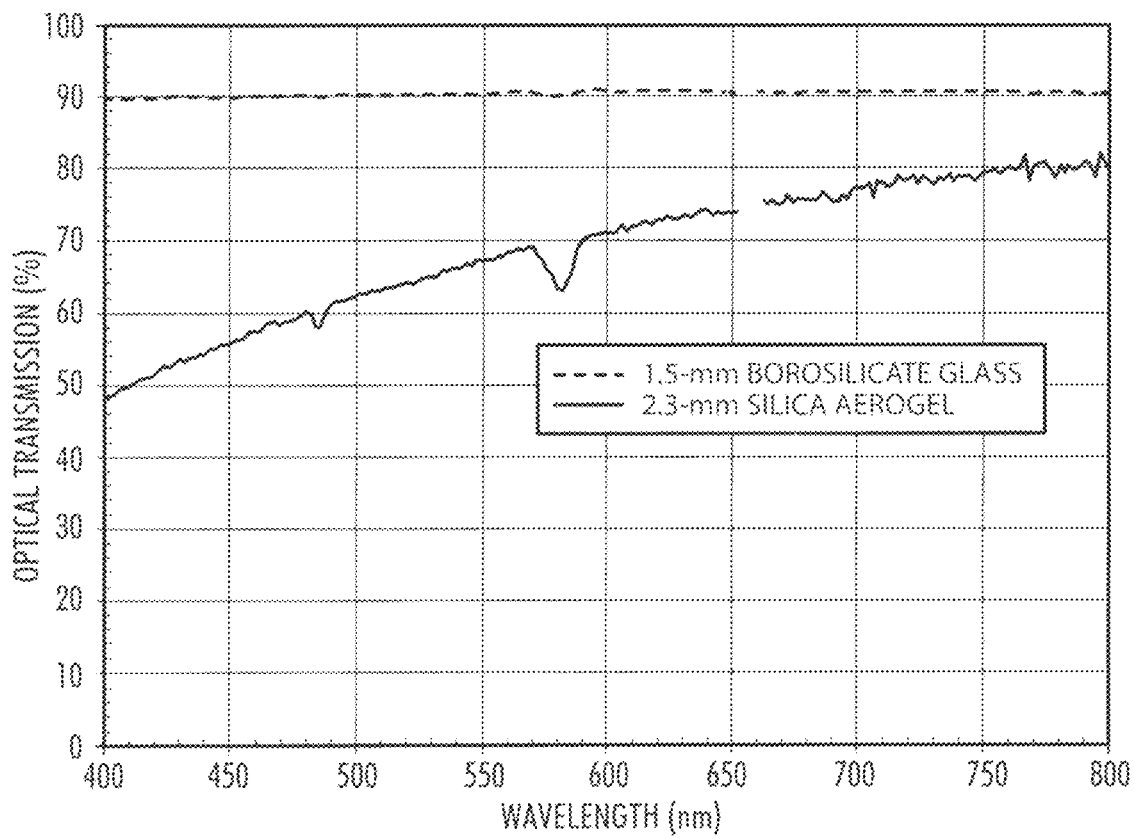
FIG. 9 is a graph showing the light transmission of a hybrid silica gel according to an embodiment of the present invention.

Still another exemplary method 100 of the present invention may include the steps of: providing porous silica particles; providing a hydrolyzed or partially hydrolyzed silica precursor, such as TEOS; mixing the hydrolyzed silica precursor with a 50:50 volume % of ethanol and acetonitrile mixture in the presence of the porous silica particles, water, and $NH_4Oh$ at 50° C. to form a hybrid silica gel; and drying the hybrid silica gel. In another exemplary embodiment using an ethanol and acetonitrile mixture as a solvent, the method may further include the steps of: adding water; and annealing the hybrid silica gel at an elevated temperature before the drying step. A photograph of an exemplary hybrid silica get formed by this method is shown in FIG. 8. The optical transmission measurement of this exemplary hybrid silica gel is shown in FIG. 9. In particular, An HP 8452 Diode Array Spectrometer was used to measure the transmission in the visible band, 400-800 nm. The results are shown in FIG. 9, which include transmission spectra of a specimen of the silica aerogel compared to a borosilicate glass slide. The transmission of the silica aerogel increased from about 50% at 400 nm to about 80% at 800 nm.

Yet another exemplary method 100 of the present invention may include the steps of: providing porous silica particles; providing a hydrolyzed or partially hydrolyzed silica precursor, such as TEOS; mixing the hydrolyzed silica precursor with an ethanol solution of the porous silica particles in the presence of water and $NH_4Oh$ at 50° C. to form a hybrid silica gel; incubating the hybrid silica gel in an excess of acetonitrile overnight at 50° C.; removing the acetonitrile; adding free acetonitrile to the hybrid silica gel; repeating the incubating, removing and adding steps two or three times; and drying the hybrid silica gel.

Another exemplary method 100 of the present invention may include the steps of: providing porous silica particles; providing a hydrolyzed or partially hydrolyzed silica precursor, such as TEOS; mixing the hydrolyzed silica precursor with an ethanol solution of the porous silica particles in the presence of water and $NH_4Oh$ at 50° C. to form a hybrid silica gel; incubating the hybrid silica gel in an excess of hexane overnight at 50° C.; removing the hexane; adding free hexane to the hybrid silica gel; repeating the incubating, removing and adding steps two or three times; and drying the hybrid silica gel.

In another exemplary method 100 of the present invention, the steps may include: providing porous silica particles; providing a hydrolyzed or partially hydrolyzed silica precursor, such as TEOS; mixing the hydrolyzed silica precursor with an ethanol solution of the porous silica particles, ethanol, and prehydrolyzed diethoxydimethylsilane (DEMS) in the presence of water and $NH_4Oh$ at 50° C. to form a hydrophobic hybrid silica gel; and drying the hydrophobic hybrid silica gel. In one exemplary embodiment using this method, the TEOS solution to DEMS solution ratio is about 3:1.

In still another exemplary method 100 of the present invention, the steps may include: providing porous silica particles; providing a hydrolyzed or partially hydrolyzed silica precursor, such as TEOS; mixing the hydrolyzed silica precursor with an ethanol solution of the porous silica particles, ethanol, and prehydrolyzed diethoxydimethylsilane (DEMS) in the presence of water and $NH_4Oh$ at 50° C. to form a hydrophobic hybrid silica gel; performing solvent exchange of ethanol with acetonitrile; and drying the hydrophobic hybrid silica gel. In one exemplary embodiment using this method, the TEOS solution to DEMS solution ratio is about 3:1.

Figure 10:
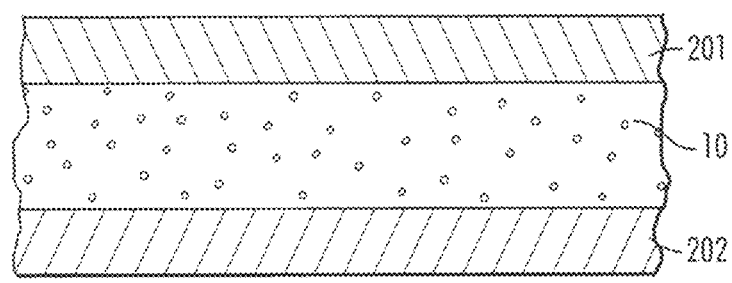
FIG. 10 is a partial sectional view of an article of manufacture incorporating a hybrid silica gel according to an embodiment of the present invention.

The present invention further includes articles of manufacture incorporating the transparent/translucent insulating material. In one embodiment, the article of manufacture of the present invention may include a fenestration system incorporating a hybrid silica gel composition. In one embodiment, shown in FIG. 10 the fenestration system includes a first planar pane of glass 201 and a second planar plate of glass 202 that defines an enclosed chamber. Within the chamber, a volume of a composition of the hybrid silica gel 10 is provided. Preferably, the chamber is sealed with a suitable gasket.

In another exemplary embodiment of the present invention, an article of manufacture incorporating the transparent/translucent insulating material may include a fenestration system that includes a skylight assembly.

In still another exemplary embodiment, the transparent/translucent insulating material may have a gel consistency and may be poured, injected, or sprayed into a mold, a void, a chamber, wall cavity or the like, for incorporation in a fenestration system.

While various embodiments and examples of this invention have been described above, these descriptions are given for purposes of illustration and explanation, and not limitation. Variations, changes, modifications, and departures from the apparatuses, systems, and methods disclosed above may be adopted without departure from the spirit and scope of this invention. In fact, after reading the above description, it will be apparent to one skilled in the relevant art(s) how to implement the invention in alternative embodiments. Thus, the present invention should not be limited by any of the above described exemplary embodiments.

Further, the purpose of the Abstract is to enable the various Patent Offices and the public generally, and especially the scientists, engineers, and practitioners in the art who are not familiar with patent or legal terms or phraseology, to determine quickly from a cursory inspection the nature and essence of the technical disclosures of the application. The Abstract is not intended to be limiting as the scope of the invention in any way.

What is claimed is:

1. An insulating material, comprising:
   a hybrid silica gel including a silica network of porous silica particles joined by silica cross-linkers, wherein the silica cross-linkers comprise at least partially hydrolyzed silica precursors, and wherein said hybrid silica gel has a thermal conductivity of about 0.15 W/m.K or less.

2. The material of claim 1, wherein each of said porous silica particles has a diameter that is less than 100 nm.

3. The material of claim 2, wherein each of said porous silica particles has a diameter that is between about 60 nm and about 100 nm.

4. The material of claim 2, wherein each of said porous silica particles has a diameter that is no more than about 60 nm.

5. The material of claim 1, wherein said hybrid silica gel has a thermal conductivity of about ≤0.032 W/m.K.

6. The material of claim 1, wherein said hybrid silica gel has a thermal conductivity of about 0.15 W/m.K to about 0.022 W/m.K.

7. The material of claim 1, wherein said silica cross-linkers include partially hydrolyzed TEOS.

8. An insulating material, comprising:
a hybrid silica gel including a silica network of porous silica particles joined by silica cross-linkers, wherein the silica cross-linkers comprise at least partially hydrolyzed silica precursors, wherein said hybrid silica gel has a visible transmittance of about 50% or more.

9. The material of claim 1, wherein each of said porous silica particles has a small grain of about 60 nm.

10. The material of claim 1, wherein said porous silica particles include pores that are ≤20 nm.

11. The material of claim 1, wherein said porous silica particles include micropores and macropores, wherein said micropores are between about 1 nm to about 6 nm, and said macropores are between about 50 nm to about 100 nm.

12. The material of claim 11, wherein said micropores are about 3.5 nm.

13. An insulating material, comprising:
a hybrid silica gel including a silica network of porous silica particles joined by silica cross-linkers, wherein the silica cross-linkers comprise at least partially hydrolyzed silica precursors, wherein said hybrid silica gel has a thermal resistance of about ≥6 hr·ft$^{2.\circ}$ F./Btu.

14. The material of claim 8, wherein said hybrid silica gel has a visible transmittance of about 99% or more.

15. A fenestration system, comprising:
a first pane of glass;
a second pane of glass, said first and second panes of glass defining an enclosed chamber;
a transparent insulating material contained within said enclosed chamber, said transparent insulating material comprising: a hybrid silica gel including a silica network of porous silica particles joined by silica cross-linkers, wherein the silica cross-linkers comprise at least partially hydrolyzed silica precursors, and wherein said hybrid silica gel has a thermal conductivity of about 0.15 W/m.K or less.

* * * * *